United States Patent [19]

Buckshaw et al.

[11] Patent Number: 5,449,860
[45] Date of Patent: Sep. 12, 1995

[54] SAFETY PLATE ASSEMBLY

[76] Inventors: Dennis J. Buckshaw, 42240 Crestview, Northville, Mich. 48167; James A. Clark, 7309 Manner Cir. #202, Westland, Mich. 48185

[21] Appl. No.: 165,706

[22] Filed: Dec. 13, 1993

Related U.S. Application Data

[63] Continuation-in-part of Ser. No. 123,333, Sep. 17, 1993.

[51] Int. Cl.⁶ .................................. H01R 13/453
[52] U.S. Cl. ..................... 174/67; 439/137; 439/145
[58] Field of Search ............ 174/66, 67; 220/241, 220/242; 439/137, 145

[56] References Cited

U.S. PATENT DOCUMENTS

| | | | |
|---|---|---|---|
| 2,477,803 | 8/1949 | Huber | 439/137 |
| 2,710,382 | 6/1955 | Fitzpatrick | 439/137 |
| 2,820,842 | 1/1958 | Meistrell | 174/67 |
| 3,068,442 | 12/1962 | Kubik et al. | 439/136 |
| 3,222,631 | 12/1965 | Cohen | 439/137 |
| 3,865,456 | 2/1975 | Dola | 439/137 |
| 4,094,569 | 6/1978 | Dietz | 439/137 |
| 4,293,173 | 10/1981 | Tricca | 439/148 |
| 4,600,258 | 7/1986 | Hu | 439/140 |
| 4,631,354 | 12/1986 | Boteler | 174/66 |
| 4,640,564 | 2/1987 | Hill | 439/137 |
| 4,733,330 | 3/1988 | Tanaka et al. | 174/66 X |
| 4,798,916 | 1/1989 | Engel et al. | 174/67 |
| 5,073,681 | 12/1991 | Hubben et al. | 174/66 |

FOREIGN PATENT DOCUMENTS

2256558  7/1975  France.

Primary Examiner—Leo P. Picard
Assistant Examiner—David Tone
Attorney, Agent, or Firm—Young, MacFarlane & Wood

[57] ABSTRACT

A safety plate assembly for use with a conventional electric outlet of the type adapted to be fitted in a panel opening and including an outlet box and an outlet mounted in the box and including a receptacle defining a pair of sockets receiving the prongs of an electric plug. The assembly includes an annular mounting plate of open frame configuration positioned against the panel in surrounding relation to the opening and a cover plate positioned over the mounting plate and lockingly secured thereto by resilient tabs on the mounting plate snappingly coacting with protrusions on the cover plate. A slide is mounted on the cover plate for movement between a safety position in which slide apertures overlie solid portions of the cover plate and an operative position in which the slide apertures are aligned with open areas of the cover plate and with the sockets of the receptacle so as to allow the prongs of the electric plug to be passed through the slide apertures and through the open areas of the cover plate for insertion in the receptacle sockets. The slide includes a shutter portion overlying the front face of the cover plate, a guide portion coacting with the rear face of the cover plate, and a juncture portion passing through an opening in the cover plate. The guide portion of the slide also coacts with the front face of the mounting plate to further facilitate the sliding movement of the slide.

11 Claims, 5 Drawing Sheets

SAFETY PLATE ASSEMBLY

RELATED APPLICATION

This application is a continuation-in-part of U.S. patent application Ser. No. 123,333, filed on Sep. 17, 1993, entitled "Safety Plate Assembly."

BACKGROUND OF THE INVENTION

This invention relates to a safety plate assembly for use with an electrical outlet.

Since the electrical contacts of the conventional electric outlet are continuously energized they represent a source of danger for electrical shocks and short circuits. While the prongs of an electrical plug are designed to be safely inserted within the outlet sockets, it is possible to cause a short circuit by insertion of a wire or other metal object into the sockets. Specifically, small children are frequently explorers and frequently, out of curiosity, insert bits of metal such as safety pins, hair pins, bits of wire or paper clips into the sockets in the outlet with resultant shock and possible injury.

One solution to this problem is the provision of plastic dummy plugs which plug into the sockets of the outlet to preclude the inadvertent insertion of pieces of metal into the sockets. However, these plastic dummy plugs are easily misplaced or broken and can be readily removed from the sockets.

Safety plate assemblies have also been proposed to replace the conventional cover plate for the outlet. The safety plate assemblies include a movable member which normally covers the sockets of the outlet but which can be readily moved to a position allowing insertion of the prongs of an electrical plug into the sockets of the outlet. Whereas the safety plate assemblies represent an improvement over the dummy plugs, they suffer from one or more disadvantages. Specifically, the prior art safety plate assemblies require the installation of special electrical outlets to accommodate the safety plate assemblies and/or they can be readily removed from the outlet so as to readily defeat their safety function and/or they are very difficult to operate to allow the insertion of the prongs of the electrical plug and/or they have a complex and expensive construction and/or they are prone to failure.

SUMMARY OF THE INVENTION

This invention is directed to the provision of an improved safety plate assembly for use with a conventional electric outlet.

More specifically this invention is directed to the provision of an improved safety plate assembly for an electrical outlet which is simple and durable in construction, inexpensive to manufacture, smooth and efficient in operation, and resistant to any attempt to defeat its safety function.

The invention safety plate assembly is intended for use with a conventional electrical outlet assembly of the type adapted to be fitted in a panel opening and including an outlet box and an outlet mounted in the box and including a receptacle defining a pair of sockets for receiving the prongs of an electrical plug.

The invention assembly includes an annular mounting plate of open frame configuration; fastener means for securing the mounting plate to the outlet assembly with the mounting plate positioned proximate the panel in surrounding relation to the receptacle; a cover plate; and coacting means on the cover plate and on the mounting plate for securing the cover plate to the mounting plate with solid portions of the cover plate overlying the fastener means to preclude removal of the fastener means without removal of the cover plate. This arrangement makes it very difficult to defeat the safety aspect of the cover plate assembly since the fastener means securing the safety plate assembly in position are inaccessible.

According to a further feature of the invention, the coacting means on the cover plate and on the mounting plate are operative in response to relative movement between the cover plate and the mounting plate to snappingly and lockingly secure the plates together. This arrangement allows the mounting plate to be secured to the outlet assembly whereafter the cover plate may be pressed against the mounting plate to snappingly secure the cover plate to the mounting plate and substantially preclude unauthorized removal of the safety plate assembly from the outlet assembly.

According to a further feature of the invention, the cover plate includes a rear face positioned in confronting relation to the panel, a front face, an opening, and at least one prong aperture, and the safety plate assembly further includes a slide including a shutter portion overlying the front face of the cover plate and including at least one prong aperture for selective coaction with the prong aperture in the cover plate, a guide portion coacting with the rear face of the cover plate, and a juncture portion passing through the opening in the cover plate. This arrangement provides a simple and effective construction for allowing ready, positive sliding movement of the slide between safety and operative positions.

According to a further feature of the invention, the coacting means on the cover plate and on the mounting plate for releasably securing the cover plate to the mounting plate are positioned totally forwardly of the rear face of the mounting plate. This arrangement allows the safety plate assembly to be used universally with any size or configuration outlet box.

In the disclosed embodiment of the invention, the cover plate has a hollow configuration defined by a front wall and an annular wall extending around the perimeter of the front wall and rearwardly from the front wall, and the coacting means on the cover plate and the mounting plate comprises tabs extending forwardly from the mounting plate for snapping coaction with undercuts provided on the inboard face of the annular wall of the cover plate.

According to a further feature of the invention, the safety plate assembly further includes a flat bar adapted to span the open frame configuration of the mounting plate and including a central hole for passage of a screw for threaded engagement with the outlet. This arrangement provides a convenient means of securing the mounting plate to the outlet in applications involving outlets of conventional design including a central cover plate screw aperture.

DETAILED DESCRIPTION OF THE PREFERRED EMBODIMENT

The invention safety plate assembly is intended for use with an outlet assembly 10 positioned in an opening 12 of a wall panel 14 and including an outlet box 16 and an outlet 18.

Outlet box 16 has a known, generally rectilinear hollow configuration and is secured for example to a 2×4 22 with its open front end 16a positioned within panel opening 12.

Outlet 18 is of known form and comprises a dual receptacle outlet including upper and lower receptacles 24 and 26, an upper bracket 28, a lower bracket 30, and a central threaded bore 32 for receipt of the usual cover plate attachment screw. Each receptacle 24, 26 includes a pair of sockets 24a, 24b, 26a, 26b and a ground socket 24c, 26c. It will be understood that the sockets 24a, 24b, 26a, 26b, 24c, 26c conform to the configuration of the prongs of a conventionally electrical plug and are adapted to plugingly receive the prongs of the plug to establish electrical connection between the plug and the outlet in known manner.

Outlet 16 is typically secured to outlet box 16 by fastener screws 34 passing through apertures 28a and 30a in upper and lower brackets 28, 30 for threaded receipt in threaded apertures in upper and lower lugs 16b formed on the front face of the outlet box with ear portions 28b, 30b of the upper and lower brackets bearing against the front surface of panel 14 to fixedly secure the outlet to the outlet box and to the panel with the outlet positioned within the hollow of the outlet box for suitable connection of an electrical power source via leads 36 passing through an opening 16c in the outlet box.

Figure 2:
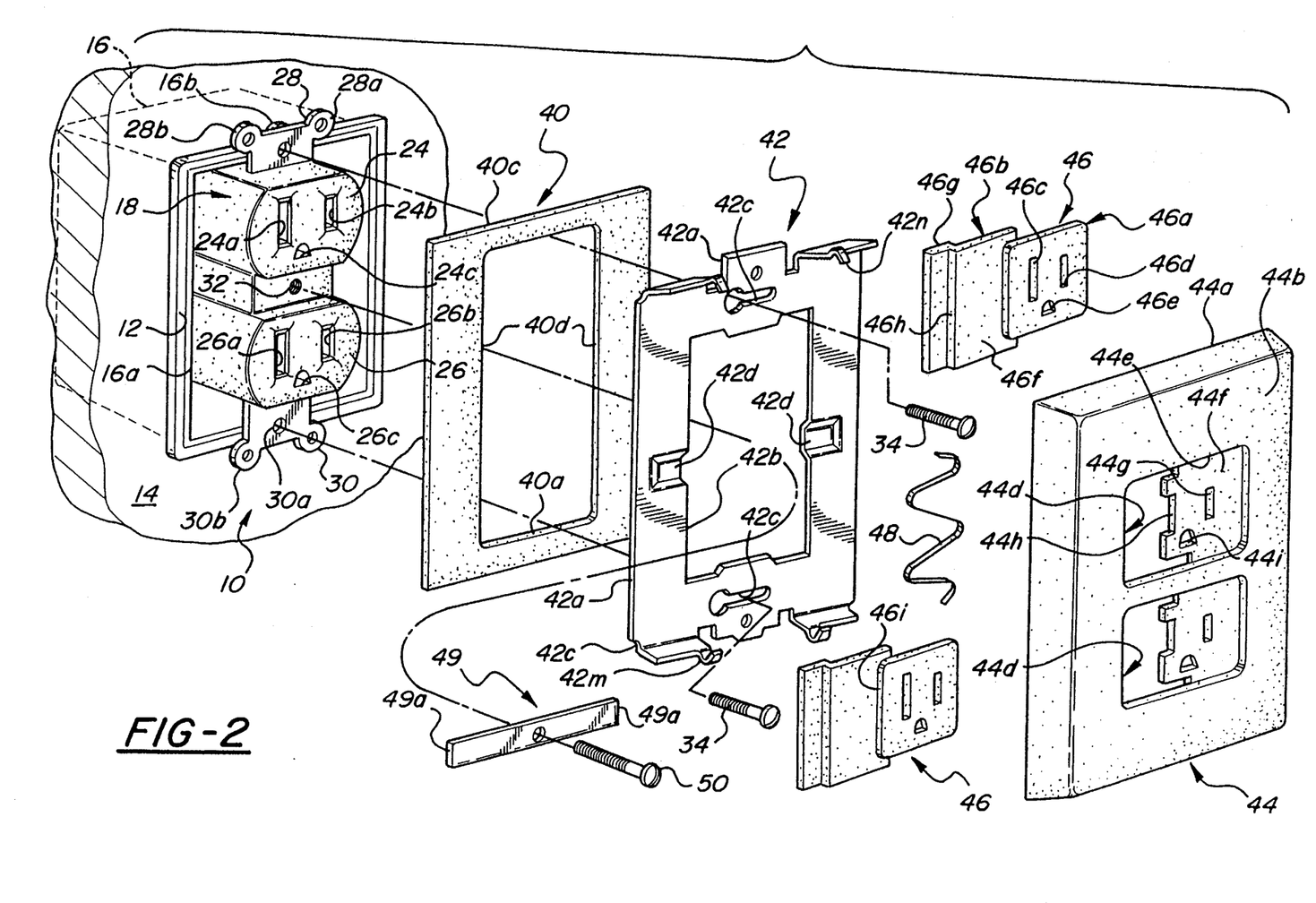
FIG. 2 is a exploded view of the safety plate assembly shown in association with an electric outlet assembly.
Figure 3:
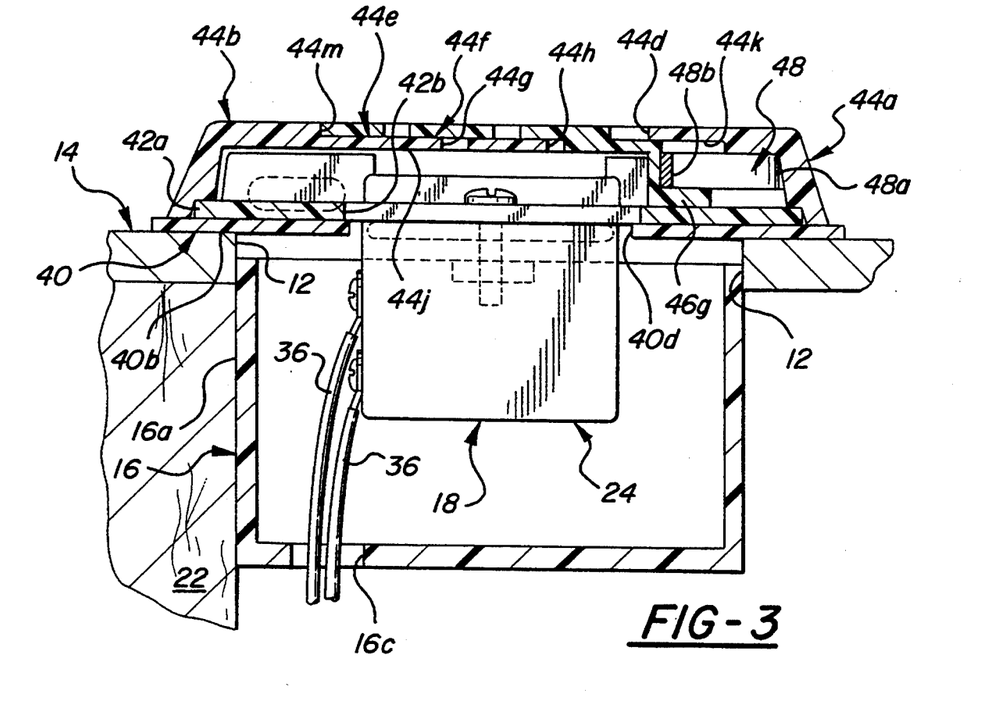
FIGS. 3 and 4 are cross-sectional views taken respectively on lines 3—3 and 4—4 of FIG. 1.
Figure 4:
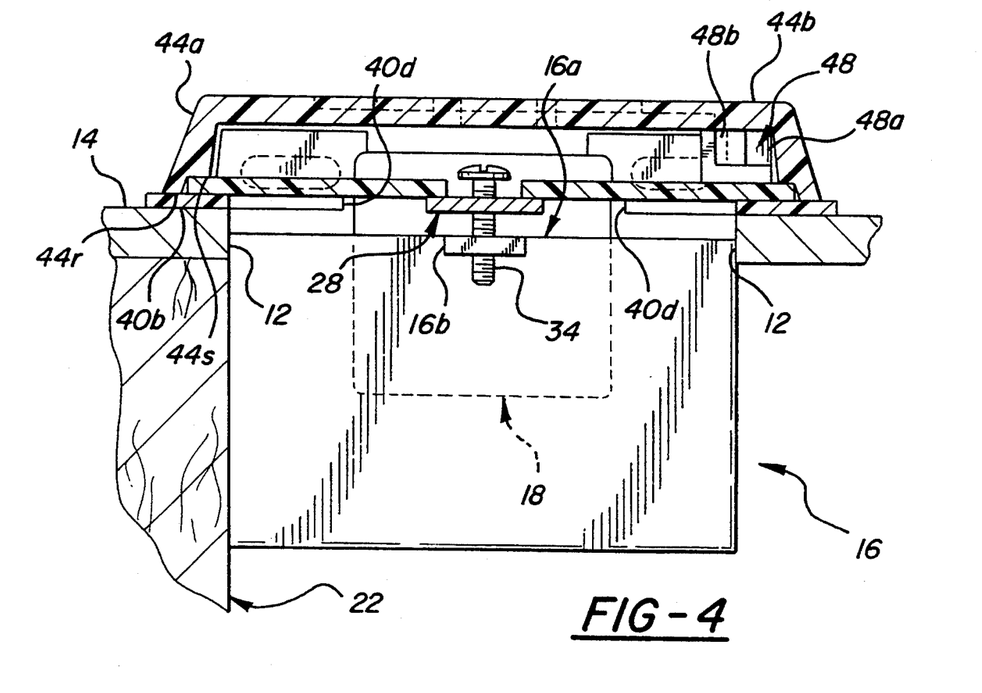

The invention safety plate assembly includes a gasket 40, a mounting plate 42, a cover plate 44, slides 46, a spring 48, and a fastener bar 49.

Gasket 40 is formed of a suitable gasket material and has a generally rectangular, open frame configuration including an annular inner periphery 40a sized to conform and fit generally around the opening 12 in the panel 14 with the rear face 40b of the gasket positioned against the front face of the panel.

Mounting plate 42 is formed of a suitable ferrous or plastic material and has a generally rectangular open frame configuration. The outer perimeter 42a of mounting plate 42 has a size and configuration smaller than the outer perimeter 40c of the gasket and greater than the inner perimeter 40a of the gasket, and the inner perimeter 42b of the mounting plate has a size and configuration less than the size and configuration of the inner perimeter 40a of the gasket but large enough to accommodate the receptacles 24, 26 of the outlet 18.

Figures 7, 13:
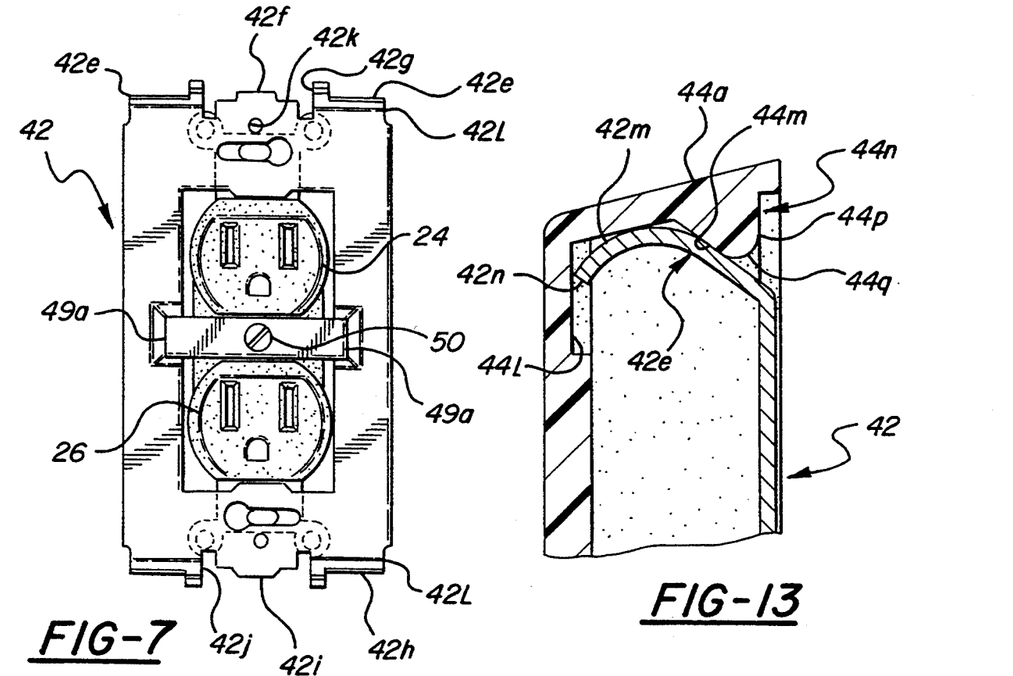
FIG. 7 is a detail view showing a mounting plate and an attachment bar utilized in the safety plate assembly.
FIGS. 13 and 14 are cross-sectional views taken respectively on lines 13—13 and 14—14 of FIG. 12.

Mounting plate 42 further includes upper and lower key hole openings 42c including slot portions 42p sized to pass the shank portions 34a of fasteners 34 and head portions 42q sized to pass the heads 34b of fasteners 34; opposed depressions 42d sized to seat the opposite ends 49a of fastener bar 49; a pair of upper forwardly extending locking tabs 42e positioned on opposite sides of central upper mounting plate portion 42f and separated from portion 42f by slots 42g; a pair of lower forwardly extending locking tabs 42h positioned on opposite sides of central lower mounting plate portion 42i and separated from portion 42i by slots 42j; and upper and lower plate mounting holes 42k. Plate 42 further includes cut-outs 42l at each corner of the plate.

Figures 6, 8:
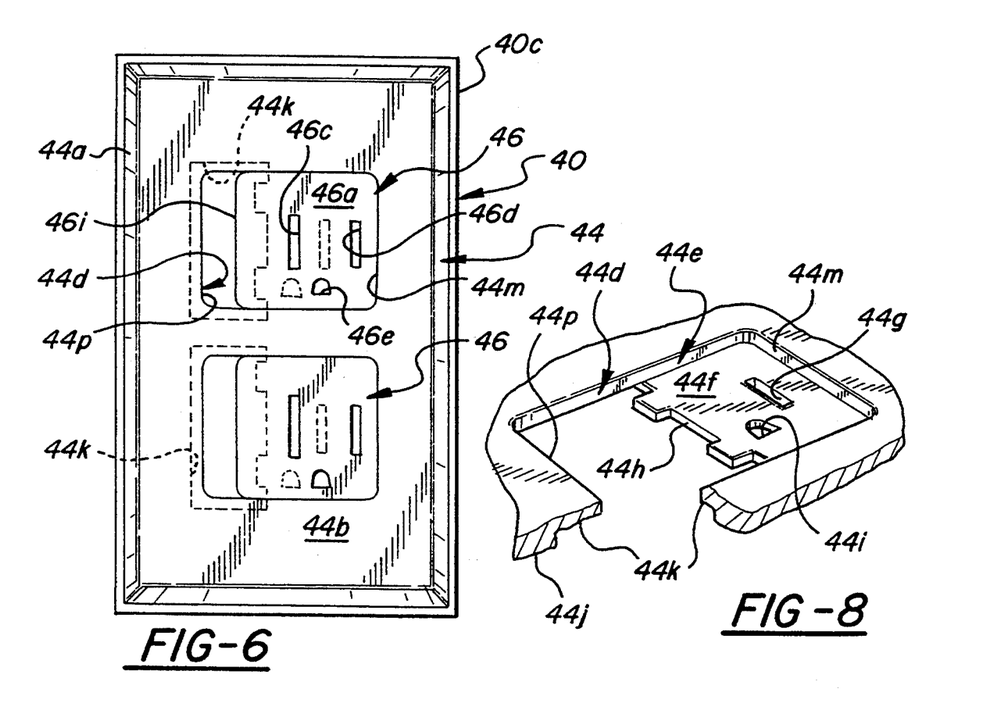
FIG. 6 is a front view of the safety plate assembly.
FIG. 8 is a fragmentary perspective view of a portion of a cover plate employed in the safety plate assembly.
Figures 12, 14:
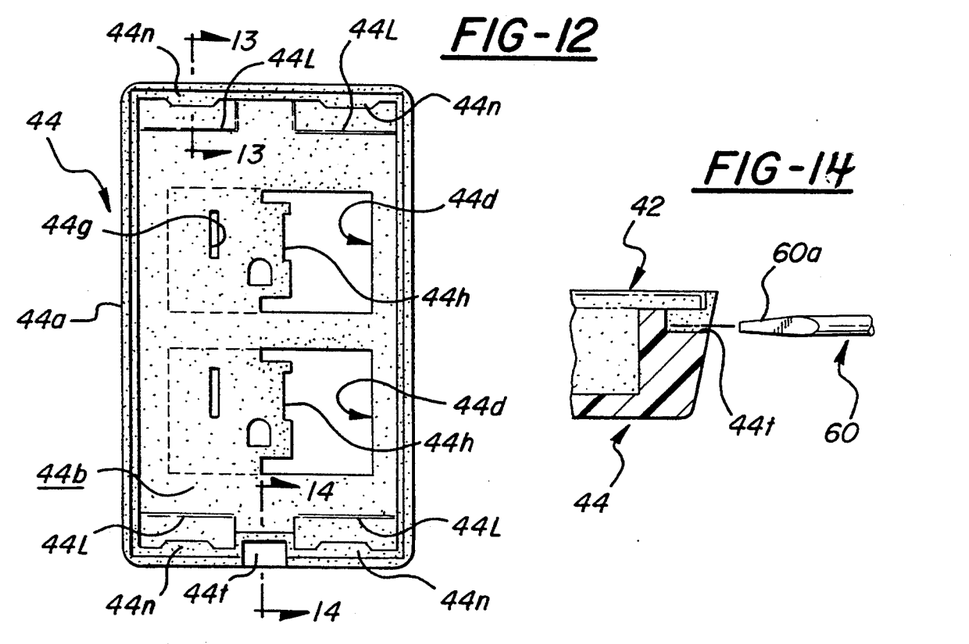
FIG. 12 is a view of the cover plate utilized in the safety plate assembly.

Cover plate 44 is formed of a suitable molded plastic material and has a hollow configuration defined by an annular wall 44a and a front wall 44b. A pair of openings 44d are provided, one above the other, in the front wall 44b and a pair of grooves 44e are provided in lateral association with each opening 44d. Each groove 44e is formed by a reduced thickness portion 44f of the front wall 44b. Each reduced thickness portion 44f is further configured to define a prong aperture 44g, a half prong aperture 44h, and a ground prong aperture 44i. The rear face 44j of the front wall is relieved to form a U-shaped groove 44k extending around the periphery of each opening 44d. Proximate each corner of the cover plate the rear face of the front wall 44b is cut away to define depressions 44l, and an undercut 44m is defined on the inboard face of the annular wall 44a proximate and confronting each depression 44l. Specifically, a laterally extending locking protuberance 44n is formed on the inboard face of the end wall portion of annular wall 44a in parallel, proximate relation to each depression 44i with the undersurface of each locking protuberance defining the respective undercut 44m.

Figures 1, 5:
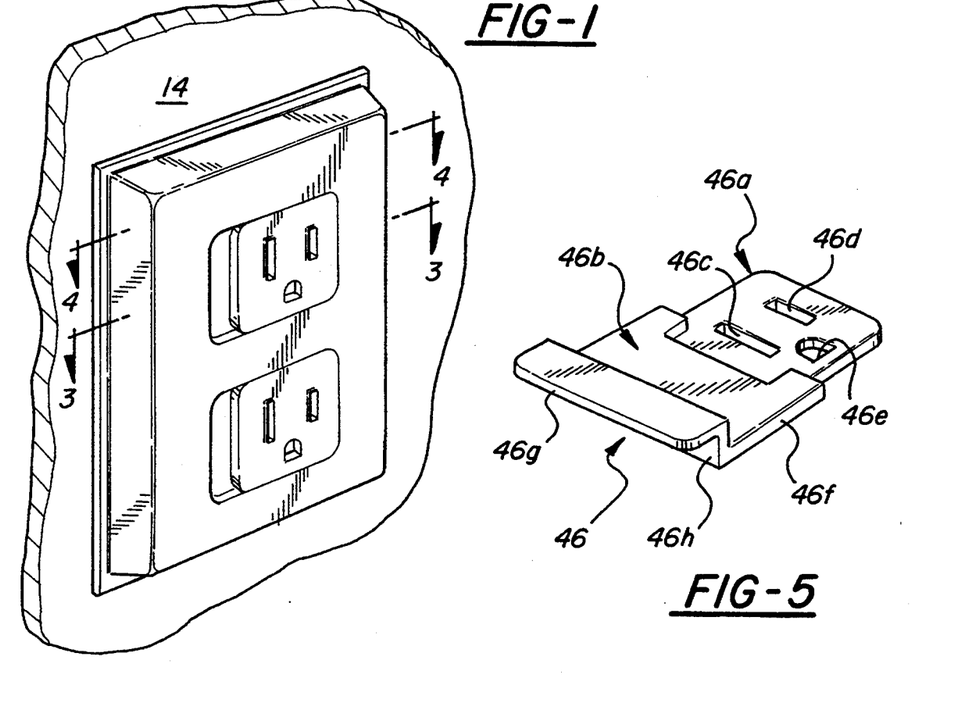
FIG. 1 is a perspective view of a safety plate assembly according to the invention shown in position in overlying relation to a conventional electric outlet assembly.
FIG. 5 is a perspective view of a slide utilized in the safety plate assembly.

Each slide 46 is formed of a suitable molded plastic material and includes a generally rectangular shutter portion 46a and a generally rectangular guide portion 46b.

Shutter portion 46a has a thickness corresponding to the depth of groove 44e and has a configuration corresponding generally to the configuration of groove 44e. Shutter portion 46a defines a pair of prong apertures 46b and 46c and a ground prong aperture 46e.

Guide portion 46b includes a generally rectangular front portion 46f having a size and configuration generally corresponding to the groove 44k in the rear face of the front wall of the cover plate, a rear portion 46g and a flange portion 46h interconnecting front portion 46b and rear portion 46g. The thickness of front portion 46b corresponds to the thickness of groove 44k.

Figures 9, 10, 11:
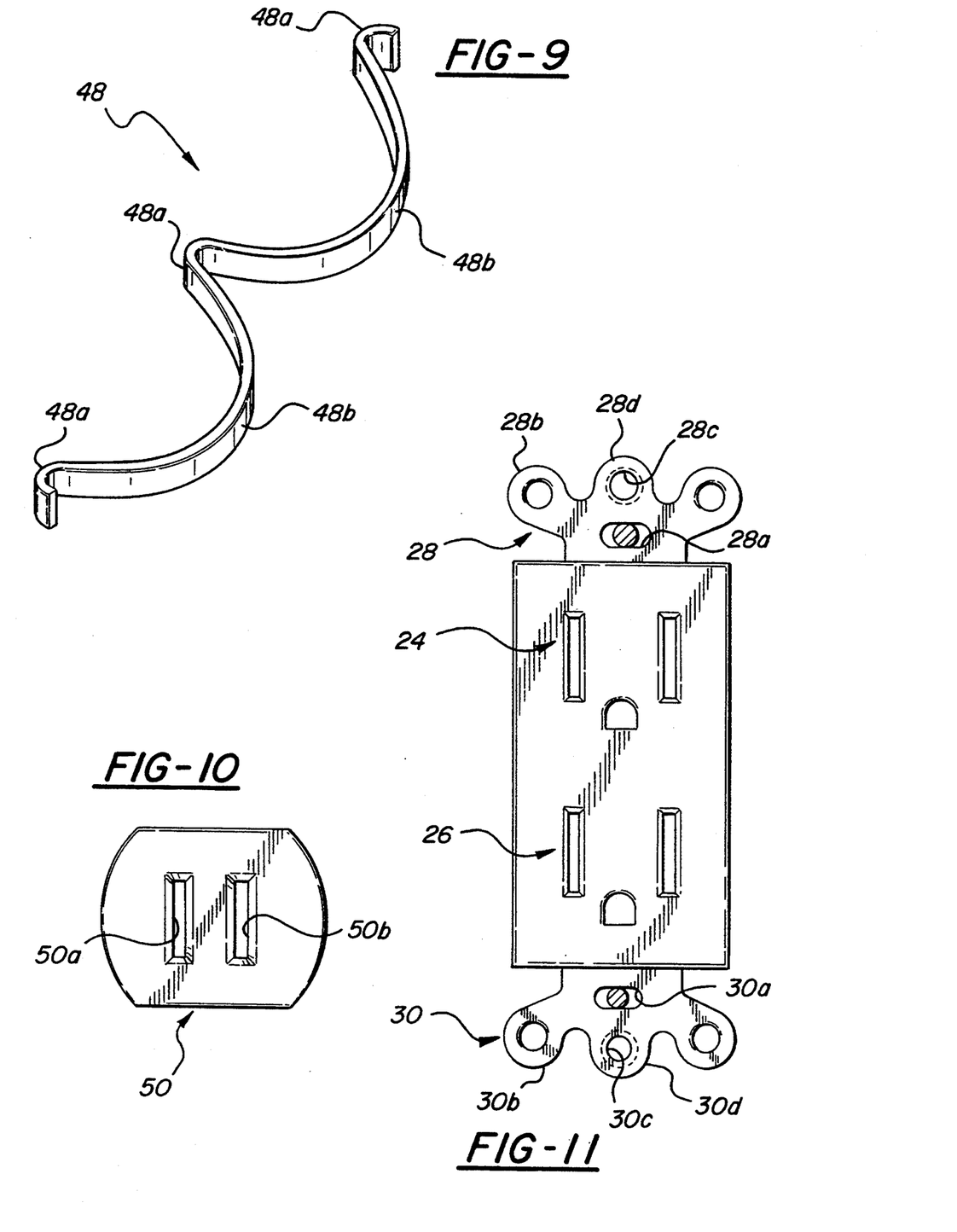
FIG. 9 is a view of a spring employed in the safety plate assembly.
FIG. 10 is a view of an older form of electric receptacle.
FIG. 11 is a view of a newer form of a dual electric receptacle.

Spring 48 is a flat wave spring and includes anchor portions 48a and active portions 48b.

In the assembled relation of cover plate 44, slides 46, and spring 48, shutter portions 46a of the slides are positioned in grooves 44e of the cover plate; front guide portions 46b of the slides are positioned in grooves 44k of the cover plate; and spring 48 is positioned in the hollow of the cover plate between a side wall 44a of the cover plate and the flange portion 46h of the slides with the spring anchor portions positioned against the side wall 44a and each spring active portion 48b engaging a flange portion 46h of a respective slide so as to urge the slides to a safety position in which the shutter portions 46a are urged against the end walls 44m of the grooves 46e so that the prong openings 46c, d and e in the shutter portions are laterally displaced with respect to the corresponding openings 44h, 44g, and 44i defined in the cover plate reduced thickness portions 44f.

To install the invention cover plate assembly on an associated outlet assembly 10, the conventional outlet cover plate is removed by unscrewing the cover plate central attachment screw 50 from threaded bore 32; the fasteners 34 are loosened; gasket 40 is positioned against the front face of panel 14 in surrounding relation to panel opening 12 with gasket vertical edges 40d positioned proximate the side faces of the receptacles of the outlet to center the gasket with respect to the outlet; mounting plate 42 is positioned over gasket 40; key hole opening head portions 42q are passed over the heads 34b of loosened fasteners 34; the mounting plate is slid laterally to move the key hole opening slot portions 42p over the shank portions 34a of fasteners 34; fasteners 34 are tightened to fixedly secure the gasket and the mounting plate to the panel 14 and to the outlet assembly; fastener bar 49 is positioned over mounting plate 22 with the bar ends 49a seated in depressions 42d; central cover plate attachment screw 50 is passed through a central hole in bar 49 for threaded engagement with outlet bore 32 to further fixedly secure the mounting plate to the outlet; and cover plate 44, with slides 46 slidably mounted therein, is positioned over mounting plate 42 and pressed rearwardly with respect to the mounting plate to move the leading surfaces 44p of the locking protuberances against the in-turned forward end portions 42m of the mounting plate locking tabs 42e. Leading surfaces 44p act to resiliently flex locking tabs 44e inwardly until the tab forward portions 44m pass the apex 44q of protuberances 44 whereafter, with continued rearward movement of the cover plate relative to the mounting plate, the locking tab portions 42m snap into locking seating engagement with the undercut surfaces 44m of the locking protuberances to lockingly and snappingly secure the cover plate to the mounting plate. It will be seen that, in the locking disposition of the cover plate and the mounting plate, the leading edges 42n of the locking tabs 42e occupy positions within depressions 44l of the cover plate. In the assembled relation of the mounting plate, gasket, and cover plate, the rear annular edge 44r of the annular wall 44a of the cover plate seats against the outer peripheral front surface of the gasket and the outer peripheral edge portion 42a of the mounting plate is received in an annular notch 44s formed in the rear annular edge 44r of the annular wall 44a of the cover plate.

It will be seen that the cover plate, once lockingly secured to the mounting plate, covers the fasteners 34 so that the fasteners cannot be removed without removing the cover plate. Since it would be very difficult for a child to undo the snapping, locking interengagement of the tabs 42e and the protuberances 44n, the invention safety plate assembly is very difficult for a child to remove.

The cover plate can, however, be readily separated from the mounting plate, as required, by a knowledgeable adult equipped with a screw driver. Specifically, as best seen in FIG. 14, the cover plate may be separated from the mounting plate by inserting the tip 60a of a screwdriver 60 into a rearwardly opening pocket 44t formed in the lower end wall portion of cover plate annular wall 44a and twisting the screwdriver tip. Since, in the assembled relation of the cover plate and mounting plate, the mounting plate central lower portion 42i directly overlies pocket 44t, twisting of the screwdriver tip 60a has the effect of prying the lower end of the cover plate upwardly with respect to the lower end of the mounting plate to disengage the lower tabs 42h from the associated undercuts 44m, whereafter the cover plate may be readily separated from the mounting plate.

In the operation of the invention safety plate assembly, the prongs of the associated electric plug are positioned in the prong apertures 46c, 46d and 46e of the respective slide and a lateral force is applied to the plug to move the slide laterally in groove 44e to move the slide apertures 46c, 46d, 46e into alignment with cover plate aperture 44h, 44g and 44i, whereafter the prongs of the plug may be inserted through the slide apertures 46c, 46d, 46e and through the cover plate apertures 44h, 44g, 44i for insertion in the receptacle sockets 24a, 24b, 24c or 26a, 26b, 26c to establish electrical contact in known manner between the plug and the outlet. The lateral movement of the slide within the groove 44e is delimited and defined by engagement of the shoulder 46i of the shutter portion of the slot with the lateral edge 44p of the association opening 44d.

It will be seen that the slide is firmly and positively guided in its lateral movement between its safety and operative positions with the shutter portion 46a sliding on the front face of the cover plate in groove 44e, the guide portion 46b of the slide guiding on the rear face of the cover plate in groove 44k, and the rear face of the slide portion 46g sliding on the front face of the mounting plate 42 with a juncture portion of the slide, constituted by the overlapping portions of the shutter portion 46a and the flange 46b, passing through the opening 44d to dispose the shutter portion 46a on the front face of the cover plate and dispose the guide portion on the rear face of the cover plate. Once the plug has been removed from the outlet, spring 48 acts to firmly and positively move the slide to its safety position in which the slide apertures 46c, d and e are laterally displaced with respect to the corresponding cover plate apertures to preclude insertion of a wire clip, etc. into the outlet by a curious child.

It will be seen that the invention safety plate assembly has important advantages as compared to prior art safety plate assemblies. For example, the assembly is difficult for a child to remove since the fastening members securing the assembly to the outlet assembly are inaccessible to the child by virtue of the locking, covering configuration of the cover plate relative to the fasteners.

Further, the slide construction, whereby the slide is guided by the front and rear faces of the cover as well as by the mounting plate, provide a positive, precise sliding action of the slide and provides a long reliable life for the assembly.

Further, the coaction of the gasket mounting plate and cover plate provides a positive sealed covering for the panel opening to prevent energy loss through the panel opening.

Further, the invention safety plate assembly has universal application to most outlet and receptacle designs. For example, with reference to the newer rectangular dual receptacle construction seen in FIG. 11 where the upper and lower receptacles 24 and 26 open in a common flat front face of the outlet, the invention safety plate assembly does not have any unique configuration that is dependent on the oval configuration of the separate upper and lower receptacle design seen in FIG. 2 but rather, since the cover overlies the receptacles, the invention safety plate assembly may be used as a cover for the electric outlet irrespective of the specific configuration of the receptacles.

Further, since the invention cover plate assembly utilizes upper and lower screws 34 to attach the mounting plate to the outlet and to the outlet box, rather than utilizing the threaded central bore 32 of the outlet, the invention safety plate assembly may be utilized with the newer receptacle seen in FIG. 11 despite the fact that the receptacle of FIG. 11 does not have a central threaded aperture for receipt of a central cover plate screw but rather, for purposes of mounting the conventional cover plate, utilizes threaded apertures 28c, 30c in ear portions 28d, 30d positioned between the ear portions 28b, 30b of the mounting brackets 28 and 30.

Further, with reference to the older receptacle 50 seen in FIG. 10 utilizing parallel sockets 50a and 50b centered in the face of the oval receptacle and lacking a ground socket, the slide plate apertures 46c, 46d and the coacting opening 44h, 44g are vertically oversized with respect to the vertical height of the receptacles 24a, 24b or 50a, 50b so that the invention circuit plate assembly may be utilized both with the socket placement of the grounded receptacle configurations of FIG. 1, in which the parallel sockets 24a and 24b are asymmetric with respect to the horizontal centerline of the receptacle, and with the older receptacle configuration of FIG. 10 in which the sockets 50a, 50b are symmetrical with respect to the horizontal centerline of the receptacle.

Further, the coacting locking means on the cover plate and mounting plate are positioned totally forwardly of the rear face of the mounting plate so that the cover plate assembly may be utilized in association with any size or shape of outlet box without concern whether the locking means on the cover plate and on the mounting plate will interfere with the outlet box.

Whereas a preferred embodiment of the invention has been illustrated and described in detail it will be apparent that various changes will be made in the disclosed embodiment without departing from the scope or spirit of the invention.

We claim:

1. A safety plate assembly for use with a conventional electric outlet assembly of the type adapted to be fitted in a panel opening and including an outlet box and an outlet mounted in the box and including a receptacle defining a pair of sockets for receiving the prongs of an electric plug, said assembly including an annular mounting plate of open frame configuration; fastener means for securing the mounting plate to the outlet assembly with the mounting plate positioned in surrounding relation to the receptacle and the rearward face of the mounting plate positioned proximate the panel; a cover plate; and coacting securing means on the cover plate and on the mounting plate for releasably securing the cover plate to the mounting plate, characterized in that:

the securing means, with the cover plate secured to the mounting plate, are positioned totally forwardly of the rearward face of the mounting plate; and the fastener means includes a bar adapted to span the open frame configuration between the vertical side portions of the mounting plate and including a central hole for passage of a screw for further engagement with the outlet and upper and lower screws passing through holes in the upper and lower portions of the mounting plate for threaded engagement with the outlet box.

2. A safety plate assembly according to claim 1 wherein:

the coacting means on the cover plate and on the mounting plate are operative in response to relative movement between the cover plate and the mounting plate to snappingly secure the plates together.

3. A safety plate assembly according to claim 2 wherein:

the coacting means comprise resilient tabs extending forwardly from the mounting plate and means on the cover plate defining undercuts to snappingly receive said tabs in response to relative movement between the plates.

4. A safety plate assembly according to claim 3 wherein:

the cover plate has a hollow configuration defined by a front wall and an annular wall extending around the perimeter of the front wall and rearwardly from the front wall; and the undercuts are defined on the inboard faces of the annular wall.

5. A safety plate assembly according to claim 4 wherein:

the undercuts are defined by protuberances extending inwardly from the annular wall.

6. A safety plate assembly according to claim 1 wherein:

recesses are provided in the front face of the vertical side portions of the mounting plate and the opposite ends of the bar are seated respectively in the recesses.

7. A safety plate assembly for use with a conventional electric outlet adapted to be fitted in an opening in a panel and including a receptacle defining sockets for receipt of the prongs of an electric plug, said assembly comprising:

an annular mounting plate of open frame configuration;

a cover plate adapted to fit over the receptacle and the mounting plate and including a front wall defining a rear face positioned in confronting relation to the panel, a front face, an opening, and at least one prong aperture, and an annular wall extending around the perimeter of the front wall and rearwardly from the front wall;

a slide including a shutter portion overlying the front face of the cover plate and including at least one prong aperture for selective coaction with the prong aperture in the cover plate, a guide portion coacting with the rear face of the cover plate, and a juncture portion passing through the opening in the cover plate;

tabs extending forwardly from the mounting plate at circumferentially spaced locations around the perimeter of the mounting plate; and undercuts defined at circumferentially spaced locations on the inboard face of the annular wall of the cover plate for snapping coaction with the tabs to releasably mount the cover plate to the mounting plate.

8. A safety plate assembly for use with a conventional electric outlet assembly of the type adapted to be fitted in a panel opening and including an outlet box and an outlet mounted in the box and including a receptacle defining a pair of sockets for receiving the prongs of an electric plug, said assembly including an annular mounting plate of open frame configuration; fastener means for securing the mounting plate to the outlet assembly with the mounting plate positioned in surrounding relation to the receptacle and the rearward face of the mounting plate positioned proximate the panel; a cover plate; and coacting securing means on the cover plate and on the mounting plate for releasably securing the cover plate to the mounting plate, characterized in that:

the securing means, with the cover plate secured to the mounting plate, are positioned totally forwardly of the rearward face of the mounting plate; and the assembly further includes a slide member having a pair of apertures sized to receive the prongs of the electric plug and mounted on the cover plate for movement between a safety position in which the slide member apertures overlie solid portions of the cover plate and an operative position in which the slide member apertures are aligned with open areas of the cover plate and with the sockets of the receptacle so as to allow the prongs of the plug to be passed through the slide plate apertures and through the open areas of the cover plate for insertion into the receptacle sockets.

9. A safety plate assembly according to claim 8 wherein:

the cover plate includes a rear face positioned in confronting relation to the panel, a front face, an opening, and at least one prong aperture; and the slide includes a shutter portion overlying the front face of the cover plate and including at least one prong aperture for selective coaction with the prong aperture in the cover plate, a guide portion coacting with the rear face of the cover plate, and a juncture portion passing through the opening in the cover plate.

10. A safety plate assembly for use with a conventional electric outlet assembly of the type adapted to be fitted in a panel opening and including an outlet box and an outlet mounted ill the box and including a receptacle defining a pair of sockets for receiving the prongs of an electric plug, said assembly including:

an annular mounting plate of open frame configuration;

means for securing the mounting plate to the outlet with the mounting plate positioned proximate the panel in surrounding relation to the receptacle;

a cover plate;

coacting means on the cover plate and on the mounting plate for securing the cover plate to the mounting plate in overlying relation thereto; and a slide member having a pair of apertures sized to receive the prongs of an electrical plug and mounted on the cover plate for movement between a safety position in which the slide member apertures overlie solid portions of the cover plate and an operative position in which the slide member apertures are aligned with the open areas of the cover plate and with the sockets of the receptacles so as to allow the prongs of the plug to be passed through the slide plate apertures and through the open areas of the cover plate for insertion in the receptacle sockets;

the means for securing the mounting plate to the outlet comprising a bar adapted to span the open frame configuration of the mounting plate and including a central hole for passage of a screw for threaded engagement with the outlet.

11. A safety plate assembly according to claim 10 wherein:

the mounting plate is secured to the outlet box by upper and lower screws passing through upper and lower holes in the mounting plate for threaded engagement with the outlet box.

* * * * *